(12) United States Patent
Svirklys

(10) Patent No.: US 8,162,651 B2
(45) Date of Patent: Apr. 24, 2012

(54) APPARATUS FOR CONTINUOUS PRODUCTION OF FOAM SHEETS

(76) Inventor: Fred Svirklys, Bolton (CA)

(*) Notice: Subject to any disclaimer, the term of this patent is extended or adjusted under 35 U.S.C. 154(b) by 90 days.

(21) Appl. No.: 12/788,814

(22) Filed: May 27, 2010

(65) Prior Publication Data

US 2010/0266719 A1 Oct. 21, 2010

Related U.S. Application Data

(62) Division of application No. 11/739,845, filed on Apr. 25, 2007, now Pat. No. 7,767,122.

(60) Provisional application No. 60/745,615, filed on Apr. 26, 2006.

(51) Int. Cl.
*B29C 43/22* (2006.01)

(52) U.S. Cl. ........................................ 425/371

(58) Field of Classification Search ................ None
See application file for complete search history.

(56) References Cited

U.S. PATENT DOCUMENTS

| | | | |
|---|---|---|---|
| 3,726,624 A | 4/1973 | Schwarz | |
| 3,746,610 A | 7/1973 | Hoegger | |
| 3,832,429 A | 8/1974 | Charpentier | |
| 3,885,009 A * | 5/1975 | Rivat-Lahousse | 264/45.4 |
| 4,255,372 A | 3/1981 | Kuhnel et al. | |
| 4,417,932 A | 11/1983 | Breitscheidel et al. | |
| 4,940,502 A | 7/1990 | Marcus | |
| 5,185,380 A | 2/1993 | Diessel et al. | |
| 5,258,085 A | 11/1993 | Breitscheidel et al. | |
| 5,286,321 A | 2/1994 | Fuss | |
| 5,525,278 A | 6/1996 | Krosch et al. | |
| 6,132,655 A | 10/2000 | Ray | |
| 6,228,478 B1 | 5/2001 | Kliwer et al. | |
| 6,299,811 B1 | 10/2001 | Gebreselassie et al. | |
| 6,537,054 B2 * | 3/2003 | Kitahama et al. | 425/224 |
| 6,576,176 B1 | 6/2003 | Gebreselassie et al. | |
| 6,623,676 B1 | 9/2003 | Davis et al. | |
| 2001/0030387 A1 | 10/2001 | Tanaka | |

* cited by examiner

*Primary Examiner* — Mary F Theisen
(74) *Attorney, Agent, or Firm* — Alston & Bird LLP

(57) ABSTRACT

Foam sheets are continuously produced by metering foam particles, which are free of any added binder or adhesive, from a storage location onto a moving conveyor at a controlled volumetric rate so as to continuously form a layer of the particles on the conveyor, heating the layer of particles to a temperature sufficient to render the particles tacky such that the particles adhere to one another so as to form a substantially integral sheet, compressing the sheet with a compression device that applies pressure on the advancing sheet so as to compress the sheet to a smaller thickness and enhance the integrity of the sheet; and cooling the compressed sheet.

20 Claims, 9 Drawing Sheets

APPARATUS FOR CONTINUOUS PRODUCTION OF FOAM SHEETS

CROSS-REFERENCE TO RELATED APPLICATION

This application is a divisional application of U.S. patent application Ser. No. 11/739,845, filed Apr. 25, 2007, now U.S. Pat. No. 7,767,122, which claims the benefit of the filing date of U.S. Provisional Patent Application Ser. No. 60/745,615 filed on Apr. 26, 2006, each of which is hereby incorporated herein in its entirety by reference.

BACKGROUND OF THE INVENTION

The present disclosure relates to the production of polymer foam sheets, planks, and the like. More particularly, the present disclosure relates to a process for converting cross-linked, closed-cell polymer (e.g., polyethylene or ethylene-vinyl acetate (EVA)) foam materials into a wide range of engineered sheet or plank products of indefinite length, and to an apparatus for carrying out such a process. The starting foam materials may be derived from virgin or postindustrial waste sources, or from a combination of both. Greater cost efficiencies are achieved when a greater percentage of the starting material is obtained from waste sources.

It is known to shred, grind, or otherwise comminute cross-linked closed-cell foam starting materials into particulate form, and to thereafter heat fuse or flame laminate the particles together under pressure to form laminated sheet or plank products. Two basic types of technologies are known for producing such sheet or plank products from cross-linked, closed-cell polyethylene or ethylene-vinyl acetate (EVA) foam starting materials. The first of these prior art technologies, commonly known as the "chimney" process, is exemplified by the process of U.S. Pat. No. 4,417,932 (Breitscheidel et al.), the disclosure of which is hereby incorporated by reference. The Breitscheidel and other similar chimney processes introduce the comminuted foam particles by gravity into a hot air chamber or "chimney", where the particles or granules are exposed to temperatures in the range of between about 100° C. and about 200° C. as they fall by gravity onto a moving bottom conveyor, where they fuse with one another. This bottom conveyor carries the particles accumulating at the bottom of the chimney toward a secondary top conveyor that compacts the fused particles between both conveyors into a sheet-like layer of target thickness prior to cooling by water and/or air.

The limitations of such chimney processes include the following, without limitation: i) it is difficult to control dosing or the amount of foam particles introduced into the chimney heating chamber to achieve and maintain a uniform end product; ii) gravity feeding produces uneven exposure to heat (heavier particles fall faster, having shorter heating or "dwell" time), thus causing inconsistent quality and strength of the finished product; iii) light particles under the same constant temperature spend more time in the heating chamber (longer dwell time) and are thus are over-exposed to temperature which, in turn, overheats the lighter particles causing blistering or complete deterioration thereof, with the result being partial or no fusion and inconsistent quality of the end product; iv) gravity feeding into the chimney is confined to the use of foam particles having approximately the same density, weight and/or dimensions to maintain uniformity of finished product, which limits the use of chimney heating technology to foams having equal particle weight, thickness, and size; v) because chimney heating is based on temperature and dwell time exposure, and because the density, specific gravity, and fusion temperature of cross-linked, closed-cell foam starting materials vary significantly from one foam to another, it is therefore not possible to use the conventional chimney technology for a broad range of foam staring materials, combined or otherwise; and finally vi) the nature of the chimney technology also has inherent difficulty in providing an even distribution of fused particles. Once the particles are fused at the bottom of the chimney, it is extremely difficult to produce an even thickness or density on the sheet-forming conveyor, which results in end products of inconsistent quality and limited end use applications. Thus, because chimney heat-fusion technology is confined to specific foam starting materials having uniform particle size, thickness, weight and density, and because the finished products of this technology lack product consistency in terms of dimensional tolerances and product density, it has therefore experienced limited market acceptance.

The second type of prior art technology known for producing laminated sheet or plank products from cross-linked, closed-cell foam starting materials is known as "press batch" type technology. This technology is a batch process operation, which produces a foam sheet or plank that is limited in its dimensions to the size of the press bed, the female mold portion resting thereon, and the platen used as the (male) mold closure. More particularly, in this process, the comminuted cross-linked foam particles are dispensed manually into a cavity of the female mold portion. The press platen is then lowered to close the mold cavity (pressure being optional, subject to the desired finished product), and the necessary heat is transferred by conduction from the heated platen and/or from the female mold into the foam workpiece to form the end product.

Shortcomings of the press batch type of technology include the following, without limitation: i) the process is limited to producing foam sheets or planks one at a time (i.e., it is not a continuous process; ii) the product is limited to the dimensions of the female mould cavity and the cooperating press platen; iii) the foam starting material used must be shredded or otherwise comminuted to a size ranging from about 1" (25 mm) to about 2" (50 mm), with a thickness greater than about ¼" (6 mm), in order to promote adequate bonding between the particles of the resulting sheet or plank; and iv) the thickness of the sheets or planks produced is limited, because there is a limit to how much sheet thickness can be heated by convective heating into the interior of the sheet. The outer surfaces of the sheet tend to be heated to a higher temperature than the interior of the sheet, thereby resulting in non-uniform bonding between the foam particles through the sheet thickness. Thus, the press batch technology is limited to a relatively narrow range of foam starting materials and a relatively thin end product, and is relatively expensive because of its time-consuming batch nature and the use of relatively expensive, close-tolerance molds. Accordingly, press batch type technology is of limited application, and is not cost-effective in the marketplace, particularly where high-volume, large-sized end products are required.

BRIEF SUMMARY OF THE DISCLOSURE

The present disclosure relates to an improved, cost-effective process and apparatus for continuous production of foam sheets or planks of indefinite length from cross-linked, closed-cell polyethylene or ethylene-vinyl acetate (EVA) foam materials derived from virgin and/or postindustrial foam waste starting materials. The sheets or planks can be, but are not limited to being, from about 2 lb/ft$^3$ (32 kg/m$^3$) to about 12 lb/ft³ (190 kg/m³) in density, from about ¼ inch (6 mm) to about 2.5 inches (64 mm) in thickness, from about 4 ft (1.2 m) to about 8 ft (3.6 m) in width, at a production rate of about 5 ft/min (1.5 m/min) to about 20 ft/min (6 m/min).

The finished product made by the presently disclosed process and apparatus is consistent in quality, and maintains dimensional and performance specifications for a wide range of applications, including, by way of example and without limitation, floating lagoon covers, underlay drainage and impact layers for sports fields having an artificial turf overlay, playground safety surfaces, and building products such as insulated wall and floor panels. Either or both of the top and/or bottom surface(s) of the foam planks or sheets so produced may be substantially smooth, grooved, embossed, cross-hatched, or otherwise patterned by effecting relatively minor variations to components of the compression and cooling device of the apparatus, thereby lending further flexibility to the process and apparatus and the range of products capable of production therefrom. A textile layer may optionally be adhered to one and/or both of the top and bottom surface(s) of the foam planks or sheets during production to still further extend the variety and utility of the products.

While the method and apparatus disclosed are advantageous for producing foam products having a wide range of finished thicknesses, they are especially valuable for producing foam sheet or plank products having greater thicknesses (e.g., greater than about 50 mm or 2 inches) and greater product consistency than heretofore readily available in the prior art. Such foam-based products lend themselves to use in a wide spectrum of applications not previously available for this class of product.

In accordance with one embodiment, the process comprises the steps of:
 (a) metering the particles, which are free of any added binder or adhesive, from a storage location onto a moving conveyor at a controlled volumetric rate so as to continuously form a layer of the particles on the conveyor;
 (b) heating the layer of particles to a temperature sufficient to render the particles tacky such that the particles adhere to one another so as to form a substantially integral sheet;
 (c) compressing the sheet with a compression device that applies pressure on the advancing sheet so as to compress the sheet to a smaller thickness and enhance the integrity of the sheet; and
 (d) cooling the compressed sheet.

More particularly, the metering step comprises using a variable dispensing device to dispense the particles onto the conveyor, the variable dispensing device being variable in geometry for adjusting a size of an opening through which the particles are dispensed so as to regulate the volumetric rate at which the particles are dispensed.

The present disclosure also relates to an apparatus for continuously producing polymer foam sheets or planks from starting polymer foam material comprising virgin and/or postindustrial polymer foam materials that have been comminuted into particles. In one embodiment, the apparatus comprises (a) a metering device including a moving conveyor and being structured and arranged to meter the particles, which are free of any added binder or adhesive, from a storage location onto the moving conveyor at a controlled volumetric rate so as to continuously form a layer of the particles on the conveyor; (b) a heating device structured and arranged to heat the layer of particles to a temperature sufficient to render the particles tacky such that the particles adhere to one another so as to form a substantially integral sheet; (c) a compression device structured and arranged to apply pressure on the advancing sheet so as to compress the sheet to a smaller thickness and enhance the integrity of the sheet; and (d) a cooling device for cooling the compressed sheet.

In one embodiment, the metering device includes a variable dispensing device to dispense the particles onto the conveyor, the variable dispensing device being variable in geometry for adjusting a size of an opening through which the particles are dispensed so as to regulate the volumetric rate at which the particles are dispensed.

The storage location for the particles can comprise a hopper having a bottom wall sloping downward toward a front wall of the hopper. In this case, the variable dispensing device comprises a metering gate adjacent an opening in the front wall of the hopper, a metering aperture being defined between the metering gate and the bottom wall through which the particles flow aided by the influence of gravity, the metering gate being adjustable in position for regulating the metering aperture.

In one embodiment, the process comprises the step of contacting the layer of particles on the moving conveyor so as to regulate the thickness of the layer before the layer is advanced to the heating step. Optionally, the contacting step can also regulate the width of the layer on the moving conveyor.

In an exemplary embodiment, the contacting step comprises contacting the layer of particles with at least one rotating device having circumferentially spaced members for contacting the particles, the at least one rotating device being rotatably driven such that said members move in a direction opposite to a direction of travel of the conveyor as said members contact the particles.

In one embodiment, the at least one rotating device comprises first and second rotating devices spaced apart along the direction of travel of the conveyor and each having said members moving in the direction opposite to the direction of travel of the conveyor. The second rotating device is downstream of the first rotating device along the direction of travel of the conveyor, and the vertical spacing between said members of the second rotating device and the conveyor is smaller than the vertical spacing between said members of the first rotating device and the conveyor.

To regulate the thickness of the layer on the conveyor, the process can include the step of adjusting a vertical spacing between said members of the or each rotating device and the conveyor.

In one embodiment, the step of heating the layer comprises advancing the layer through a heating device comprising a housing that defines a substantially enclosed interior, and circulating heated air through the interior of the housing. The interior of the housing is divided into substantially separate first and second chambers, the second chamber being downstream of the first chamber in the direction of travel of the layer through the housing. The step of circulating heated air comprises circulating a first portion of the heated air through the first chamber in a first direction and circulating a second portion of the heated air through the second chamber in a second direction different from the first direction.

As one example, one of the first and second directions can be generally vertically downward and the other of the first and second directions can be generally vertically upward.

The process can further comprise the step of adjusting the speed of travel of the layer through the heating device so as to adjust a dwell time of the layer in the heating device.

In some embodiments, an upper surface of the layer is not contacted by any belt or any part of the heating device as the layer travels through the heating device.

Advantageously, the cooling step takes place concurrently with the compressing step. As an example, the cooling step can comprise contacting the sheet with chilled water.

The compressing step can comprise advancing the sheet on a conveyor through a nip defined between the conveyor and a compression member. The compression member can comprise a compression belt, or one or more compression rollers. In some embodiments, the compression member is operable to emboss the sheet with a predetermined embossing pattern.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF THE DRAWINGS

The present invention now will be described more fully hereinafter with reference to the accompanying drawings in which some but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Figure 1:
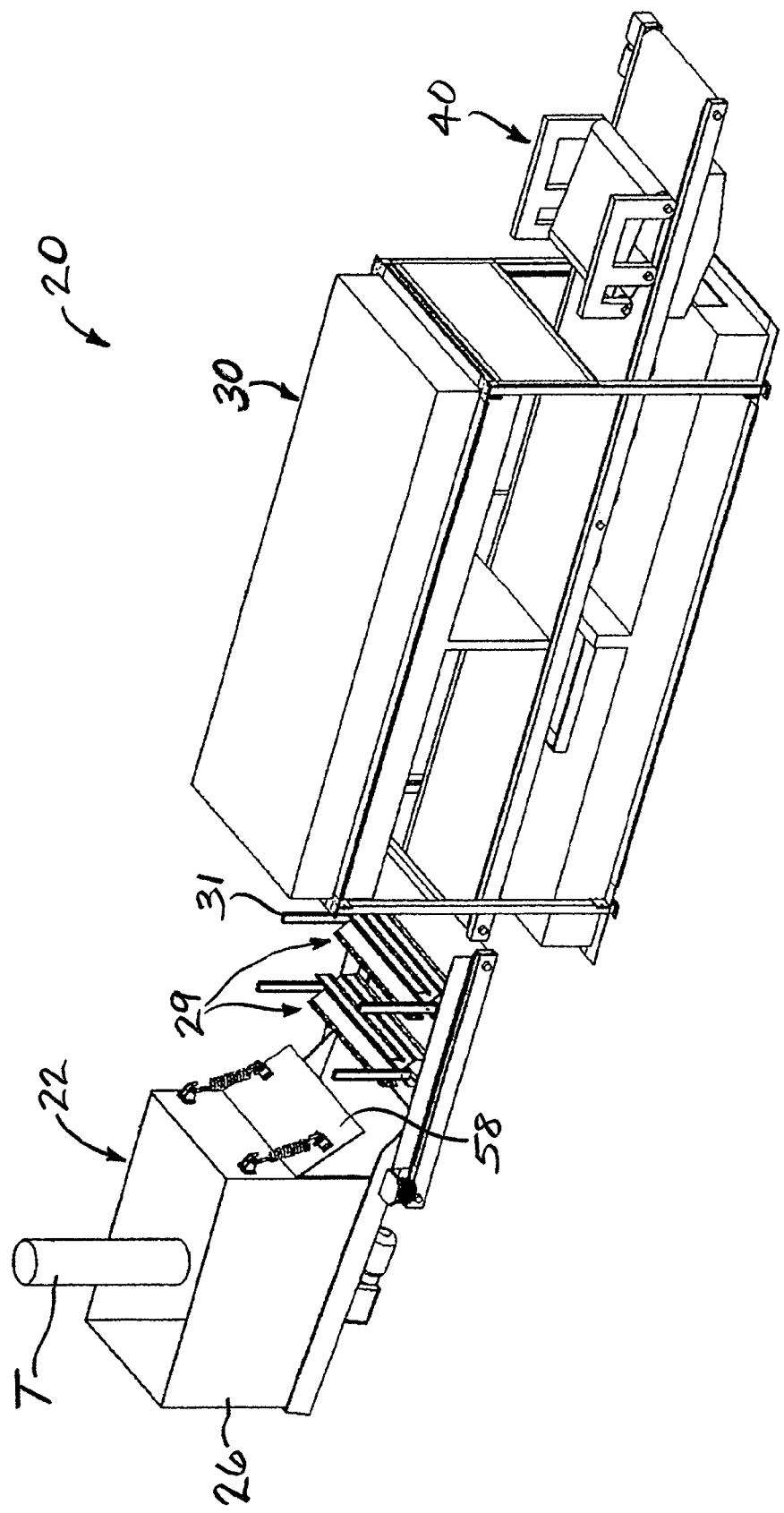
FIG. 1 is a perspective view of an apparatus for continuously producing polymer foam sheets or planks in accordance with one embodiment of the invention.

Referring now to FIG. 1, there is illustrated by way of non-limiting example an apparatus 20 according to one embodiment of the present invention for the production of engineered sheet or plank products of indefinite length from comminuted, cross-linked, closed-cell polymer (e.g., polyethylene or ethylene-vinyl acetate (EVA)) foam particles, which products may be subsequently cut to desired variable lengths. The apparatus 20 comprises a continuous processing line for the production of such sheet or plank products. The apparatus includes a metering section 22, illustrated on a larger scale in FIGS. 2 and 3, wherein the comminuted foam particles 24 are fed from a hopper 26 at a controlled rate onto a first conveyor 28 for further metering into a pro-forma particulate layer 27 by one or more adjustable paddlewheel devices 29 mounted within the metering section 22.

Figure 4:
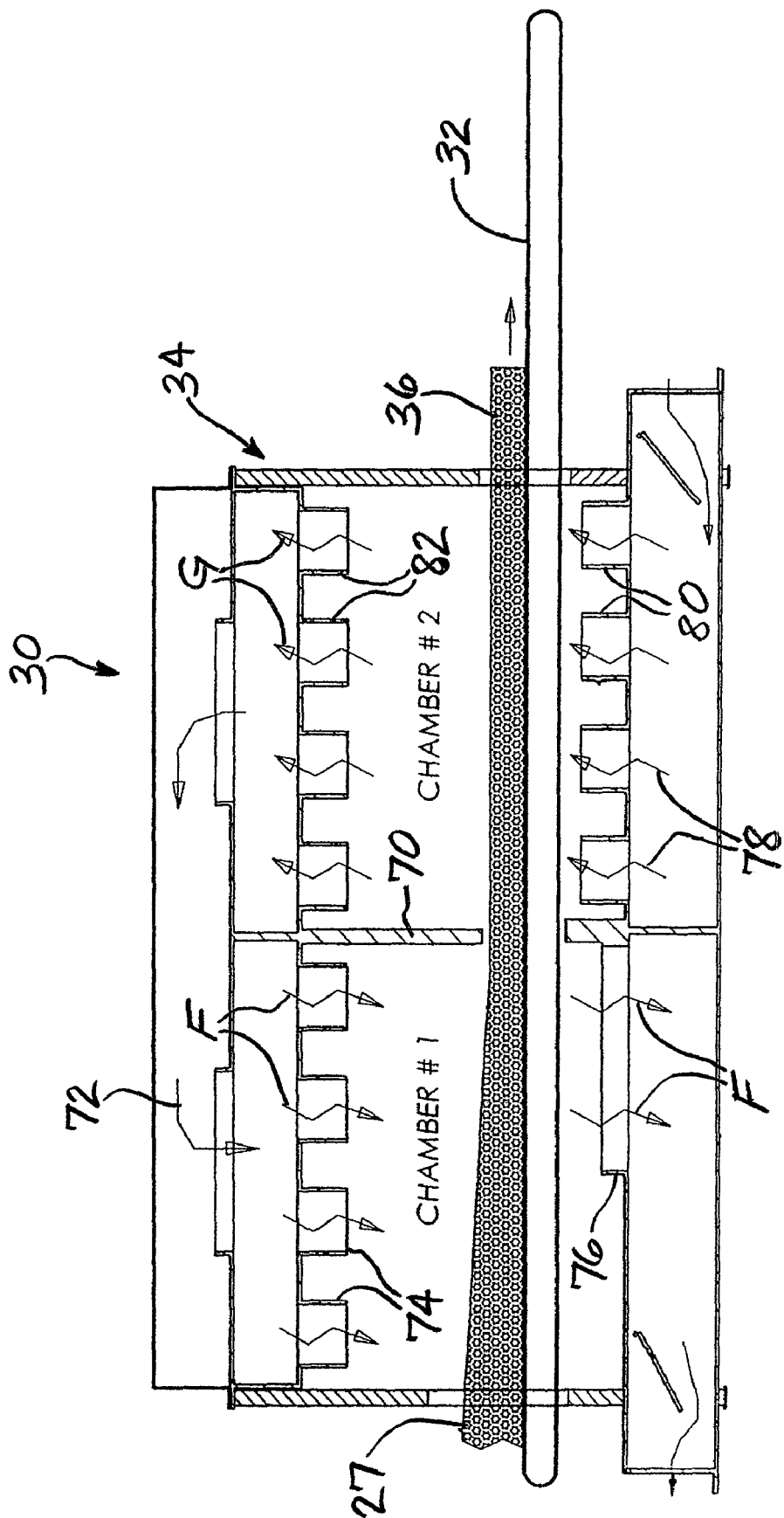
FIG. 4 is a side view, partly in section, of a heating device in accordance with one embodiment of the invention.

The apparatus 20 further comprises a heating device 30, illustrated on a larger scale in FIG. 4, wherein the comminuted foam particles 24 pass from the metering section 22 onto a second conveyor 32 for transport through a two stage heating/fusion oven 34, wherein the pro-forma particulate layer 27 of comminuted foam particles 24 is evenly heated throughout under closely controlled conditions to cause fusing together of the particles making up such layer 27 to form a continuous fused pre-sheet 36 of laminated foam particles. The pre-sheet 36 is of intermediate thickness to the pro-forma particulate layer 27 and the finished sheet S produced by the apparatus 20.

Figure 5:
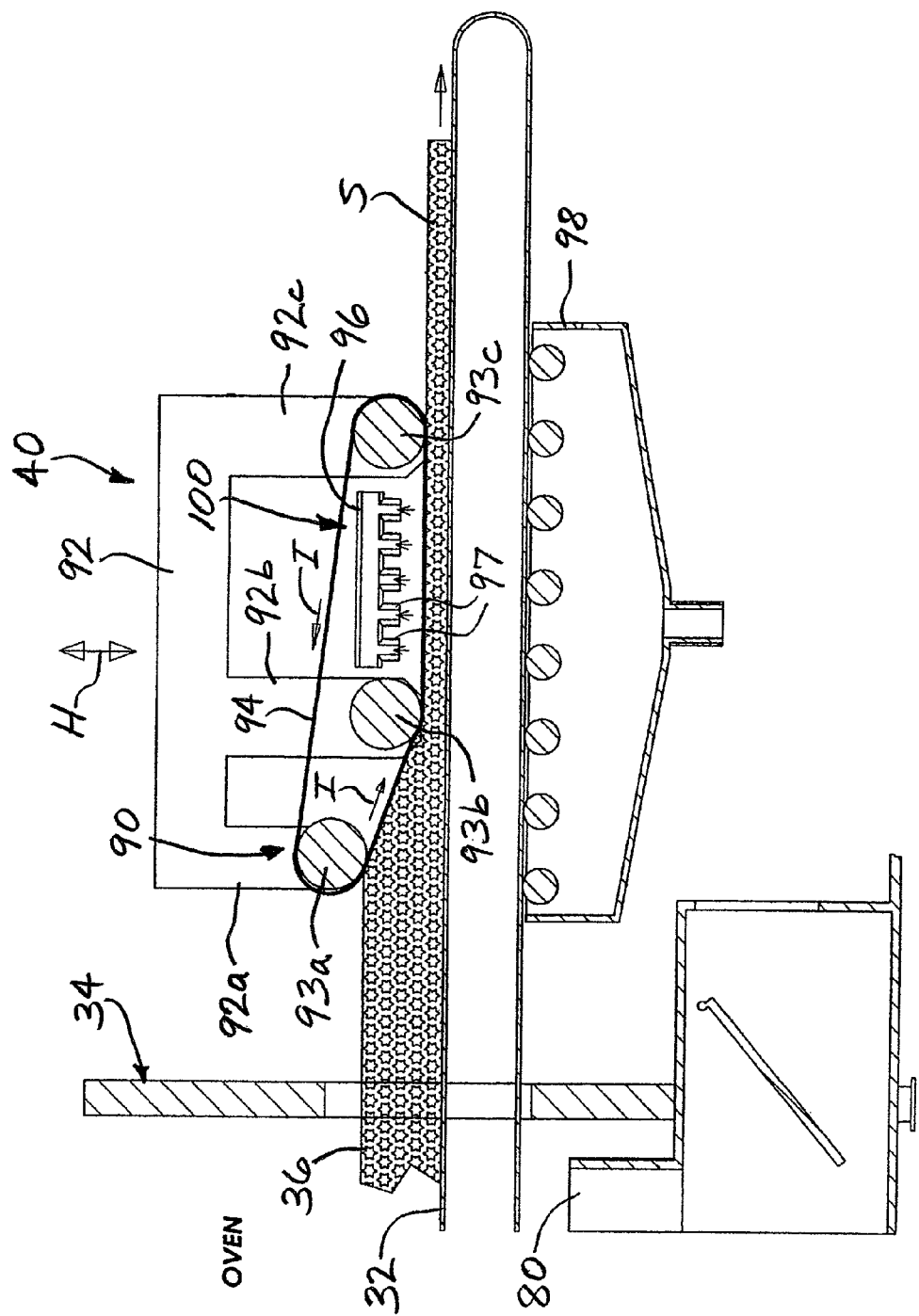
FIG. 5 is a side view, partly in section, of a cooling device and compression device in accordance with one embodiment.
Figure 6:
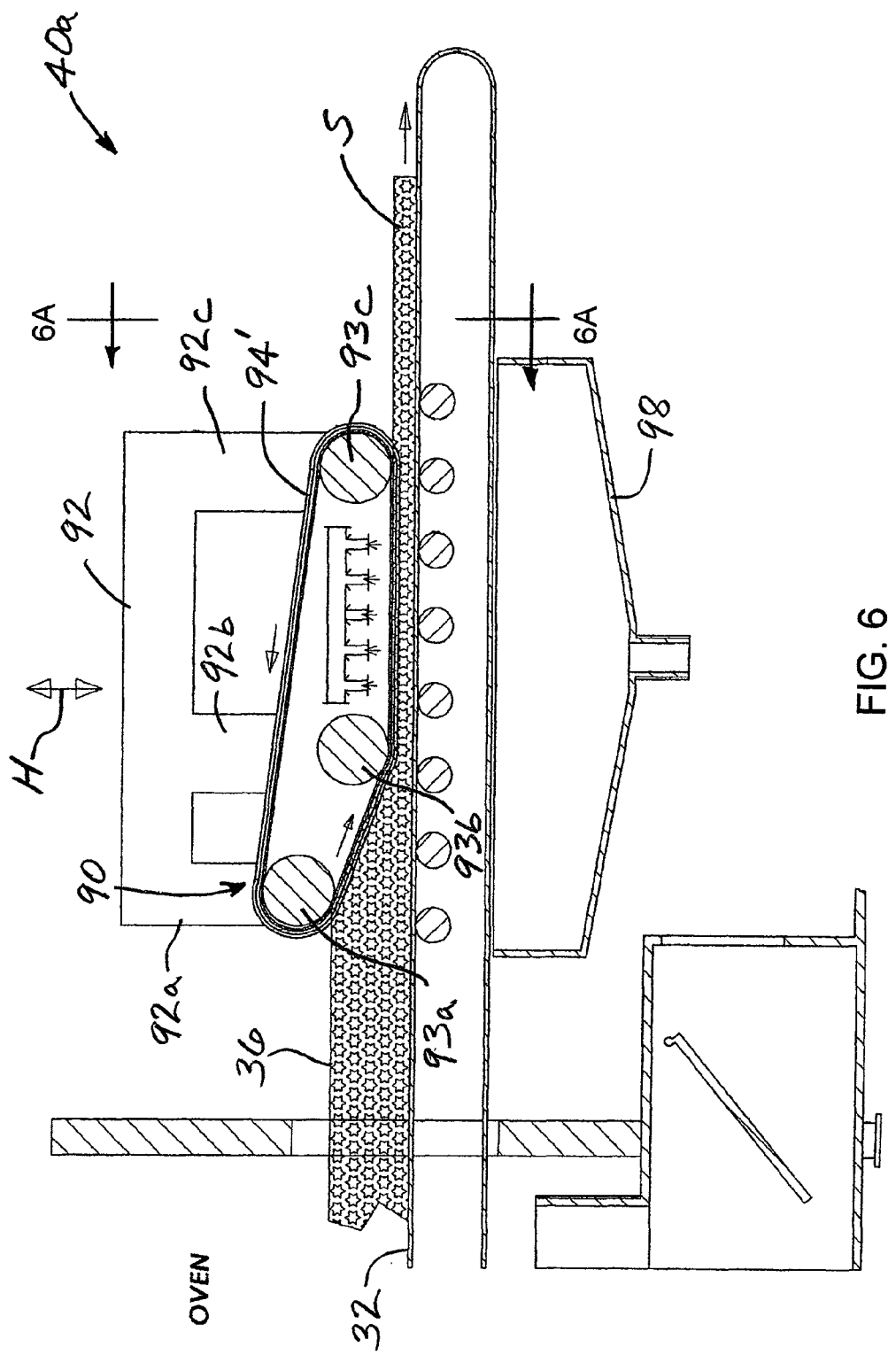
FIG. 6 is a side view, partly in section, of a cooling device and compression device in accordance with another embodiment of the invention.
Figure 6B:
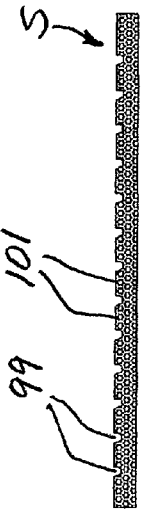
FIG. 6B is a cross-sectional view through the sheet formed by the cooling device and compression device of FIG. 6.
Figure 6C:
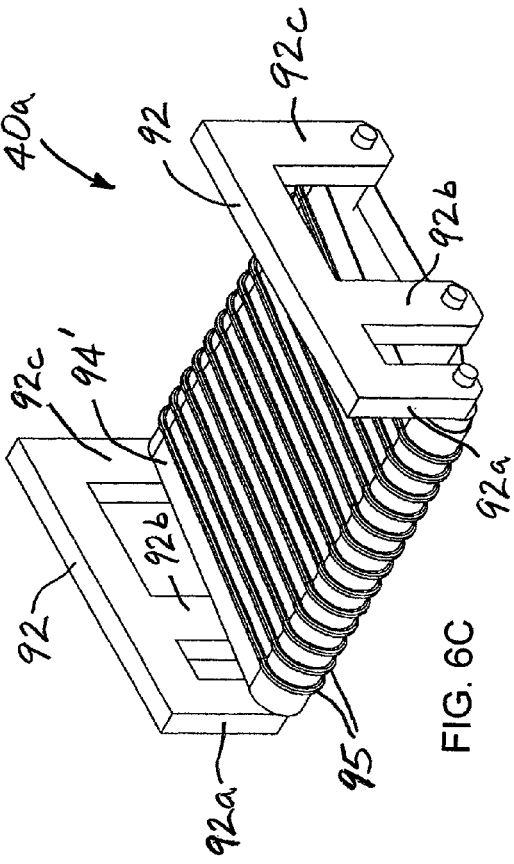
FIG. 6C is a perspective view of a portion of the device of FIG. 6.
Figure 6A:
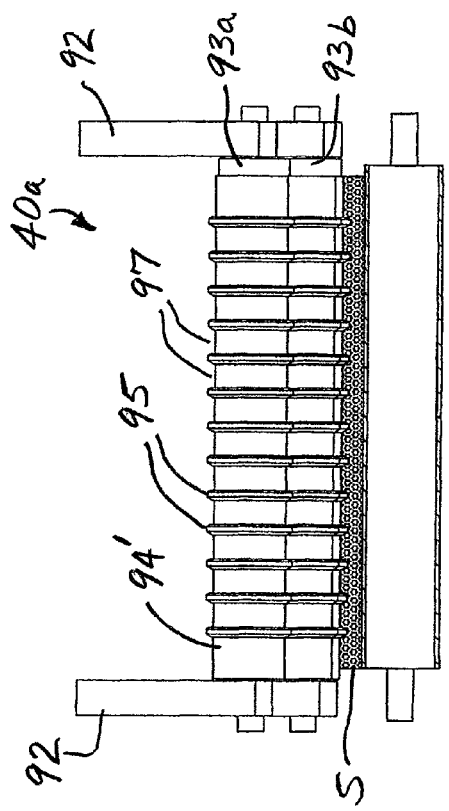
FIG. 6A is a view along line 6A-6A in FIG. 6.
Figure 7:
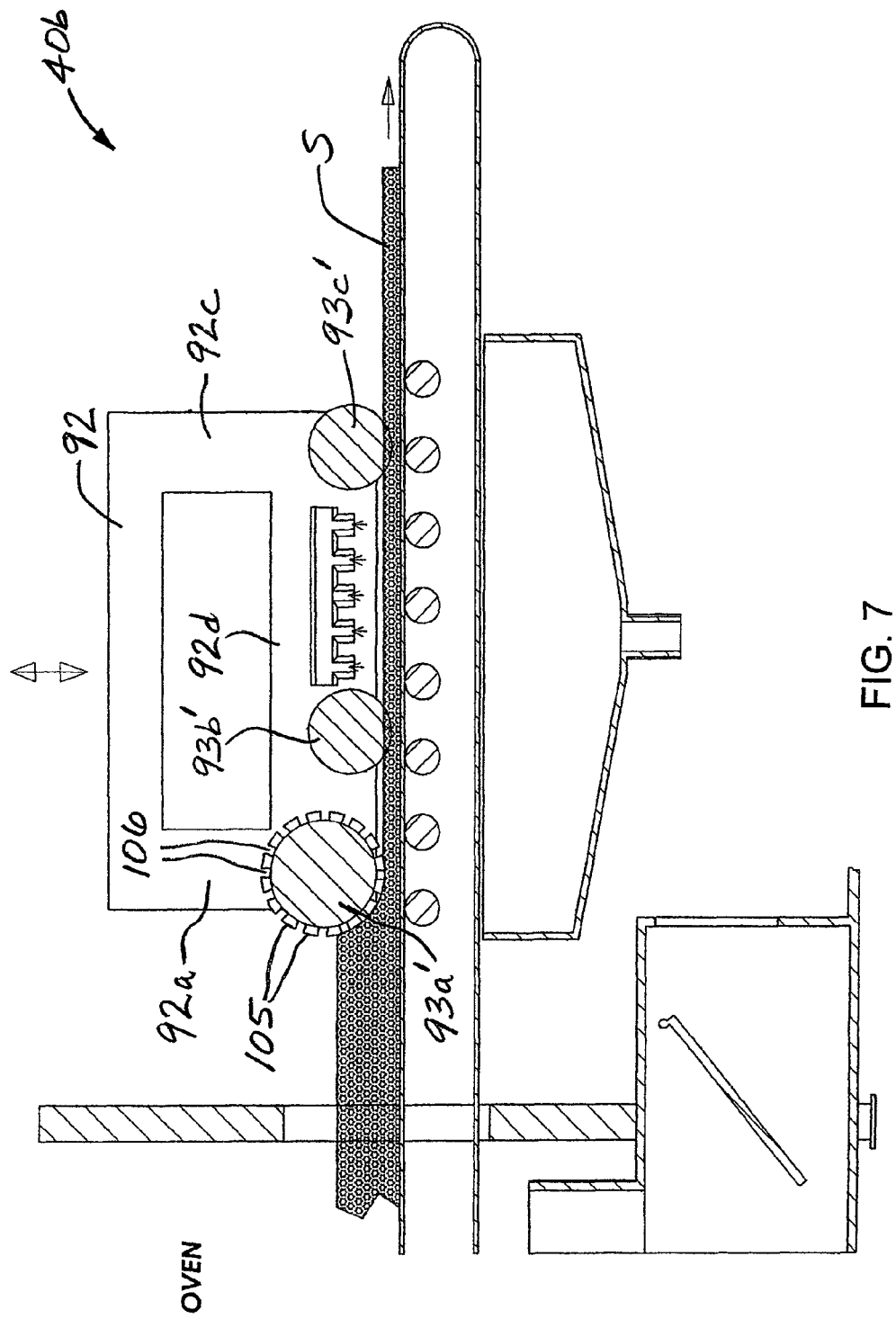
FIG. 7 is a side view, partly in section, of a compression device and cooling device in accordance with a further embodiment of the invention.
Figures 7A, 7B, 7C:
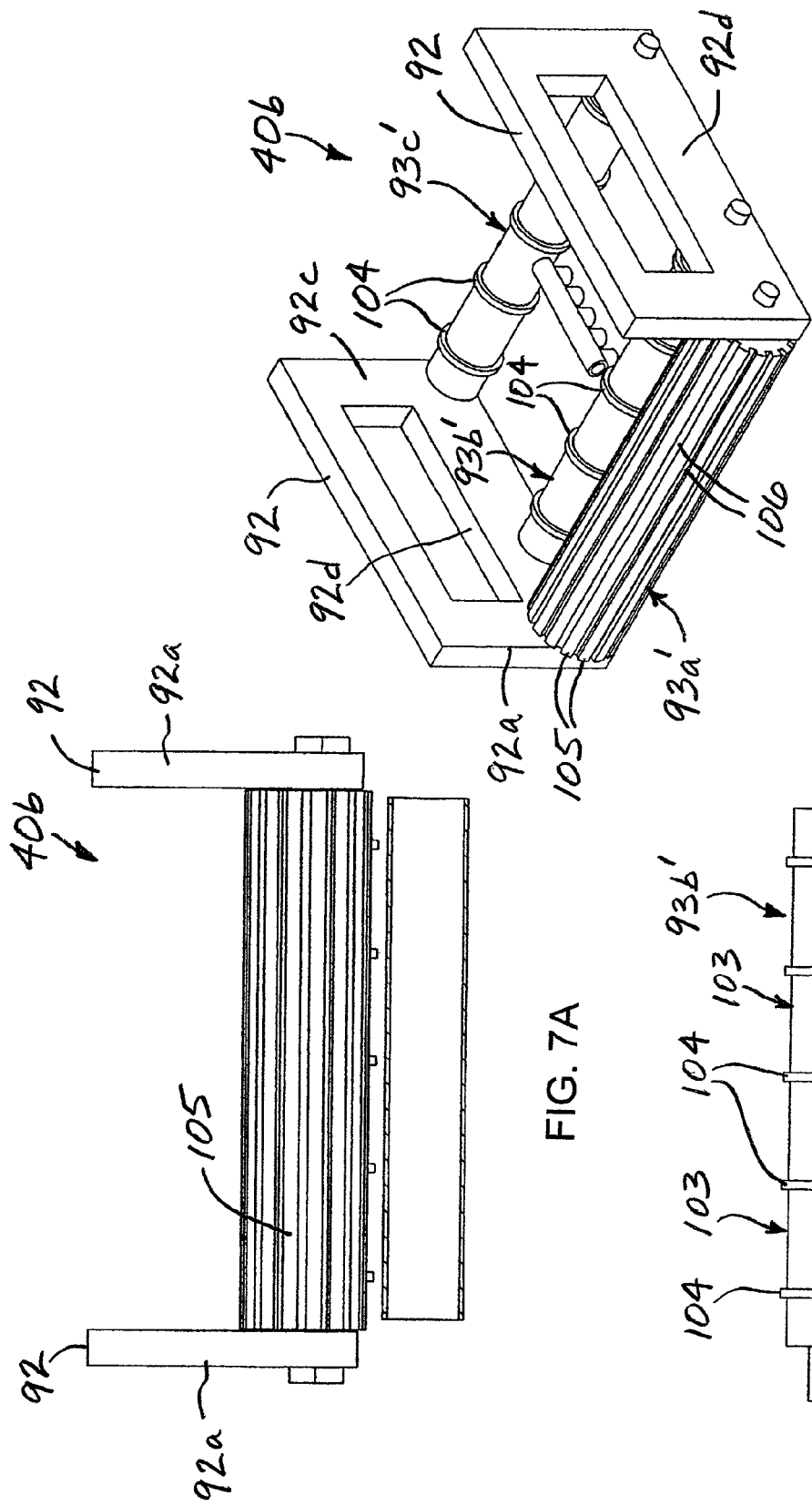
FIG. 7A shows a portion of the device of FIG. 7, as viewed along the direction of travel of the sheet through the device.
FIG. 7B shows a compression roller of the device of FIG. 7.
FIG. 7C is a perspective view of a portion of the device of FIG. 7.

The apparatus 20 also includes a compression and cooling device 40, one embodiment of which is illustrated on a larger scale in FIG. 5. The compression and cooling device 40 is designed to compress and cool the fused pre-sheet 36 moving therethrough on the second conveyor 32 to thereby produce a finished sheet S having smooth upper and lower surfaces.

Two alternative embodiments of the compression and cooling device are illustrated in detail in FIGS. 5, 6A, 6B, and 6C (wherein the first alternative compression and cooling device is designated by the reference numeral 40a) and in FIGS. 7, 7A, 7B, and 7C, (wherein the second alternative embodiment is designated by the reference numeral 40b), wherein changes to the various rollers and belts used therein are respectively illustrated, the effect of such first and second alternatives being to produce finished sheets S having embossed upper surfaces of differing patterns.

All of the above-described components of the apparatus 20 are described in further detail below.

Starting Materials

The raw starting materials used in the process and by the apparatus of the present invention preferably comprise postindustrial closed-cell polyethylene, cross-linked polyethylene, and EVA foam waste of various densities, shapes, and colors, generated by polyethylene foam manufacturers, converters, and fabricators. One large source of such suitable waste is the automotive industry, which generates huge volumes of this material from automotive interior and underhood sound deadening and heat insulating applications. In the absence of a cost-effective process for reusing or recycling of such foam waste, as represented by the present invention, extremely large volumes of this type of foam waste currently end up in landfill sites. Typically this foam waste is shipped for recycling in bails, buns on skids, or in large plastic bags. While some of this incoming waste may be sorted and stored according to the density and quality of foam therein, a significant majority thereof has a mixed density and quality content, which has been a severe limit to its further usage in the prior art. A significant advantage of the present invention is that waste of such mixed density and quality can still be utilized to produce usable end product sheets by the process and apparatus of the present invention.

Preparing the Foam Waste for Subsequent Processing

Waste foam is selected for initial shredding according to density, melting point, coefficient of expansion, and fusing qualities. Bails, bags or loose foam waste are placed onto a conveyor (not shown) feeding a shredder or shredders (also not shown). The function of the shredder(s) is to comminute the multitude of various waste foam starting shapes to irregular, granular shaped comminuted foam particles 24 having from about ½" diameter to about 2" diameter, depending upon the desired end-use application. The hourly capacity of the shredder or shredders should be matched to the hourly consumption of the foam processing apparatus 20.

The granular particles are then transported from the shredder(s) by air or auger transport means (not shown) to a holding bin (also not shown) where dust and surplus air are removed. The function of the holding bin is to hold a sufficient amount of comminuted foam particles 24 as a reserve in the event the upstream shredder capacity cannot keep up with the processing consumption of the apparatus 20, or in the event of a malfunction of the shredder(s). The holding bin (not shown) can be of almost any shape and/or holding capacity, preferably providing a minimum holding capacity of 4 to 6 hours of the process requirements of the apparatus 20.

Figure 2:
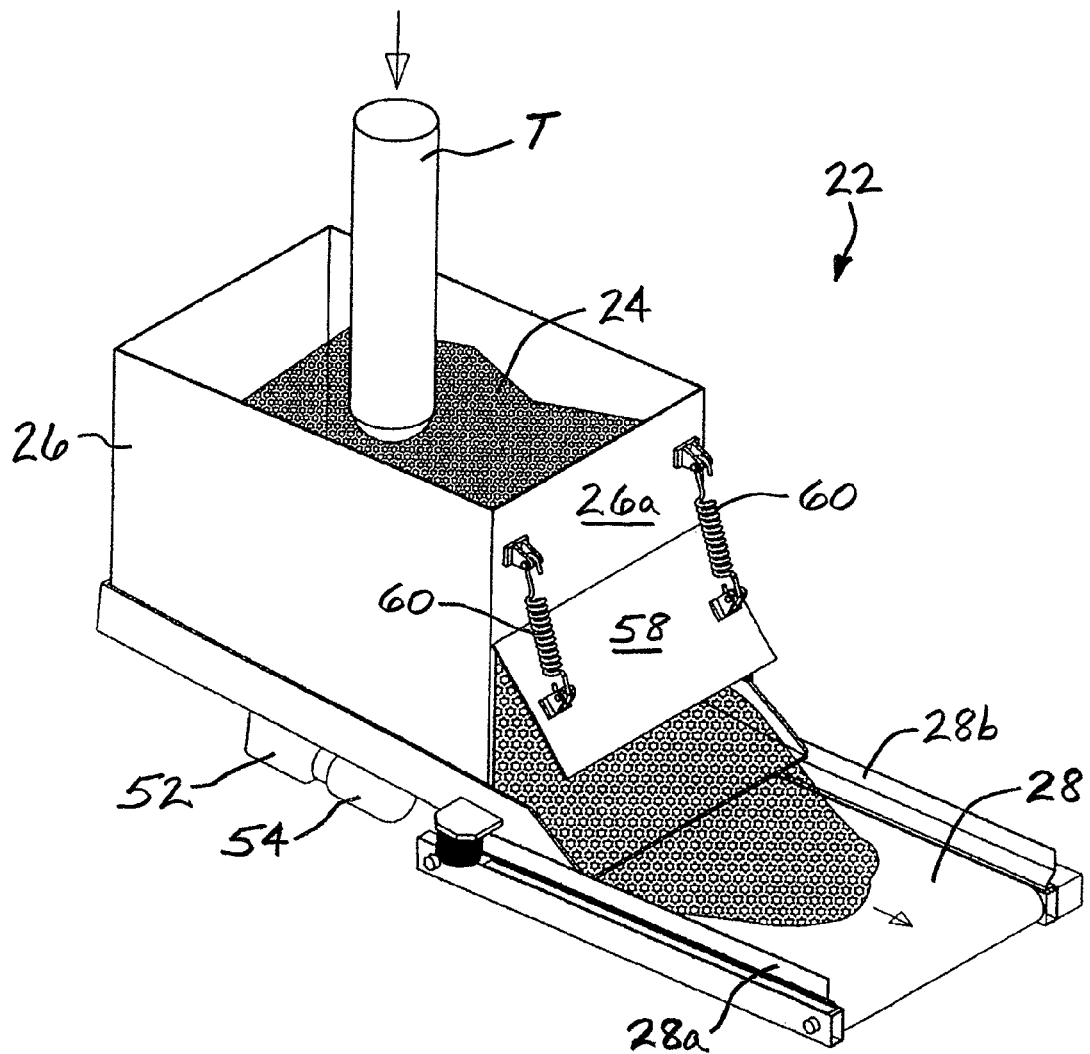
FIG. 2 is a perspective view of a metering device in accordance with one embodiment of the invention.

From the holding bin (not shown) the comminuted foam particles 24 are transported by air or auger transport means through a supply tube T to the hopper 26 (FIG. 2). The function of the hopper 26 is to deliver the appropriate volumetric flow rate of foam particles 24 to the first conveyor 28 on an operatively continuous basis as determined by the parameters (most notably, thickness, density and porosity) desired for the finished sheets S. The belt of the first conveyor 28 is preferably constructed from stainless steel mesh or the like, and may or may not be TEFLON® (PTFE) coated to resist sticking of the foam particles. The size of the hopper 26 is subject to the processing volume requirements of the apparatus 20, and should typically hold, for example, from about 50 to about 100 cubic feet of foam particles having from about ½" to about 2" diameters.

Figure 3:
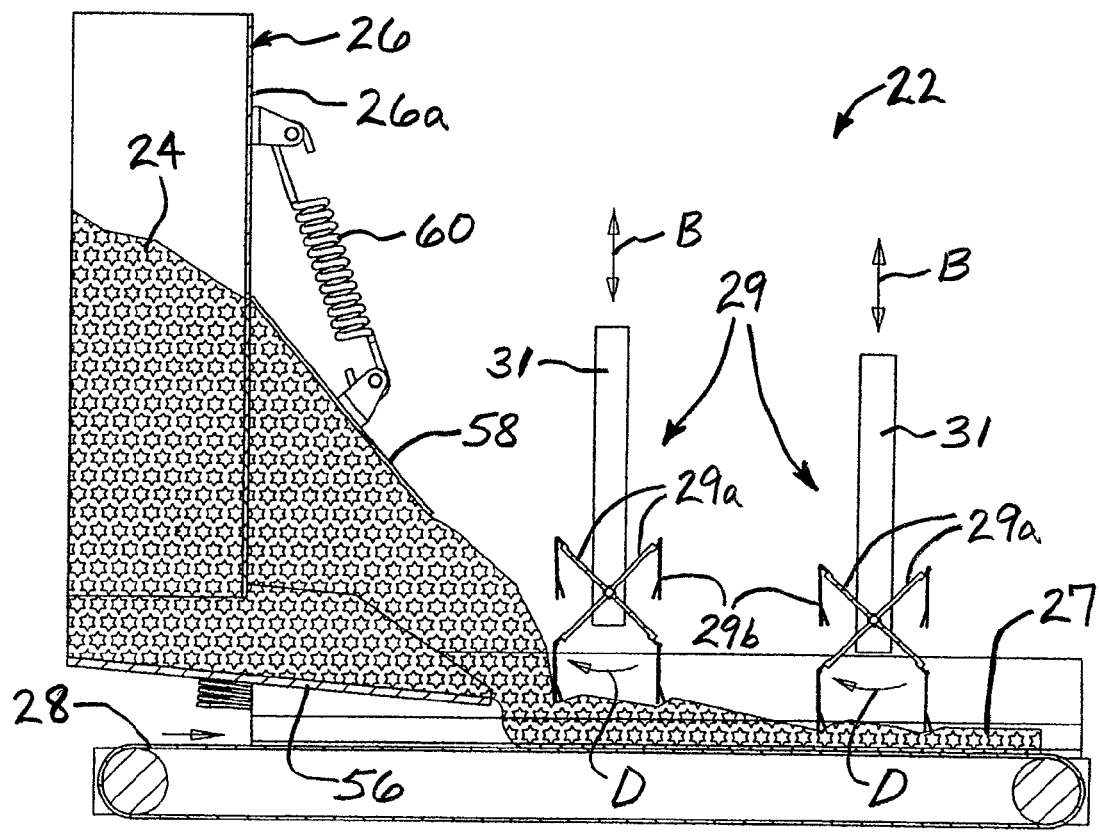
FIG. 3 is a side view, partly in section, of the metering device of FIG. 2.

With reference to FIGS. 2 and 3, the hopper preferably includes a vibrating mechanism 52 driven by an electric motor 54 and connected to an inclined floor 56 of the hopper 26 in such a manner that the foam particles 24 within the hopper 26 are continually being agitated to prevent their bridging or compacting within the hopper, which bridging or compacting would hinder the free flow of the particles from the hopper. The hopper is further equipped with an adjustable dispensing gate 58 that controls the flow of foam particles through an opening in the front wall 26a of the hopper to a rate predetermined according to the required thickness and width of the finished sheet product. The width dispensing range is preferably from about 24" to about 72" wide, with a thickness range preferably from about 1" to about 16" thick. The dispensing gate 58 is pivotally mounted on the front wall 26a such that the gate pivots about its upper edge, and is adjustable by a pair of biasing devices 60, 60 located adjacent opposite lateral edges of the dispensing gate 58 and interconnected between the front wall 26a and the dispensing gate 58. Each of the biasing devices 60 may be a coil spring as shown, or, for example, a gas load strut (not shown). Adjustment of the strength of the biasing devices 60 varies the degree of opening of the dispensing gate 58, and hence the rate of flow of the foam particles through the opening in the front wall of the hopper. Thus, interchanging one pair of biasing devices 60, 60 for another pair of biasing devices of different strength is one way of variably controlling the flow of the foam particles from the hopper; alternatively, variable strength biasing devices 60, for example, adjustable gas load struts, (not shown) may be employed to effect such rate control. Of course, it is also possible to use controllable actuators (e.g., electric motor-powered mechanisms, hydraulic actuator-powered mechanisms, or the like) for regulating the position of the gate 58, if desired.

The foam particles 24 are in this manner dispensed at a predetermined required volumetric rate from the hopper 26 down the angled floor 56 in a predetermined width (determined by the width of the floor 56 and of the first conveyor 28) and in a controlled thickness (determined by the degree of opening of the dispensing gate 58) onto the first conveyor 28 positioned thereunder. A pair of optional edge skirts 28a, 28b (FIG. 2) can be mounted on opposite sides of the first conveyor 28 to prevent spillage of the foam particles from the first conveyor. A textile sheet (not shown) optionally can be placed over both the first conveyor 28 and second conveyor 32 to feed continuously therealong with the pro-forma particulate layer 27, thereby forming a base substrate that will be become adhered to the lower surface of the fused pre-sheet 36 as it passes through the heating/fusion oven 34. This textile sheet is preferably a polyester textile sheet, and not only assists in preventing the foam particles from adhering to the first and second conveyors of the apparatus 20, but also provides further structural integrity to the finished planks or sheets S, and adapts them for a variety of additional end uses.

Once the measured layer of foam particles 24 is dispensed onto the first conveyor 28 or onto the textile-covered first conveyor 28 as the case may be, the layer passes under one or more height-adjustable paddlewheel devices 29 mounted within the metering section 22 of the apparatus 20. Two such paddlewheel devices 29 are shown in the drawings, one mounted downstream (i.e., in the direction of travel of the foam particle layer) of the other. The paddlewheel devices 29 are each rotatably mounted above the first conveyor 28 on a respective paddlewheel frame 31, each of which frames is independently adjustable in both vertically upward and vertically downward directions, as indicated by double-headed arrows B of FIG. 3. The paddlewheel devices 29 each has a plurality of primary arms 29a extending radially outwardly from the central axis of the paddlewheel device 29, with each primary arm 29a having a secondary arm 29b pivotally mounted adjacent its outer edge to freely hang in gravity dependent relation therefrom for contacting the foam particles as they are carried therebeneath by the first conveyor 28. Each of the paddlewheel devices 29 is rotatably driven in the clockwise direction (indicated by arrows D, D of FIG. 3), such that the secondary arms 29b have a significant component of horizontal motion in the opposite direction of movement of the foam particle layer carried by the first conveyor 28 as the secondary arms contact the foam particles. Vertical adjustment of the paddlewheel frame 60 allows the gap defined between the free end of each secondary arm 29b and the top surface of the first conveyor 28 (or the top surface of the optional textile sheet lying atop the first conveyor 28) to be adjusted. This, in turn, permits variation of the thickness of the layer of foam particles passing thereunder to form the pro-forma particulate layer 27. Thus, one or more paddlewheel devices 29 constructed, arranged, and operating in the general manner described above assure that the required height and width of foam particles which make up the pro-forma particulate layer is maintained and evenly distributed. Such even distribution is critical to the production of an end sheet or plank product S having uniform physical characteristics. It will be understood, however, that the present invention can be practiced with paddlewheel devices, or more generally other types of rotary devices, of configurations different from the particular paddlewheel devices 29 as illustrated and described herein.

The paddlewheel devices 29 should, but need not be, constructed and otherwise adapted to be adjustable from about 24" to about 72" in width, and the gap described above should be, but need not be, adjustable from about 1" to about 16" in height, depending upon the requirements of the finished sheet or plank product. It will also be appreciated that other types of devices for contacting the layer of particles on the moving first conveyor can be employed, if desired.

Following the progression depicted in FIG. 3, the first conveyor 28 hands off the pro-forma particulate layer 27 to the second conveyor 32 just before the layer enters the heating/fusion oven 34. The belt of the second conveyor 32 is preferably constructed from stainless steel mesh or the like, and may or may not be TEFLON® (PTFE) coated to resist sticking of the foam particles 24 thereto. The aforesaid transfer of the pro-forma particulate layer to the second conveyor 32 is further facilitated where the aforementioned optional textile layer (not shown) is used. In this latter case, the textile layer also passes from the top surface of the first conveyor 28 onto the top surface of the second conveyor 32 as it carries the pro-forma particulate layer. In either case, the second conveyor 32 transports the pro-forma particulate layer 27 of relatively uniform thickness through an upstream end of the heating/fusion oven 34 into its interior. It is also possible to arrange the first conveyor 28 to extend through the oven 34, such that no second conveyor is required. In any event, during passage through the interior of the oven 34, the pro-forma particulate layer 27 can be reduced in thickness by as much as 50% to 75%, depending upon the type, density, and melting point of a given foam waste starting material. The average thickness reduction is in the range of about 60%.

The function of the heating/fusion oven 34, which is desirably but not necessarily powered by natural gas, fuel oil, or electricity, is to fuse or weld the foam particles together to achieve a homogeneous foam sheet or plank S. This is accomplished by heating the particles 24 sufficiently such that at least the surfaces of the particles 24 melt or partially melt so as to be rendered soft and tacky, the tacky particles then fusing together. It is advantageous in this regard that the heat of the oven be evenly distributed and within +/−2 degrees Celsius of the target design temperature, which for the foam materials mentioned herein is typically in the range of from about 115 degrees Celsius (239 degrees Fahrenheit) to about 180 degrees Celsius (356 degrees Fahrenheit), subject to specific foam particle makeup. Average operating temperatures for the oven 34 for these types of foam materials are typically in the range of about 138 degrees Celsius (280 degrees Fahrenheit) to about 160 degrees Celsius (320 degrees Fahrenheit), subject again to specific foam particle makeup.

In order to achieve such even heating within the heating/fusion oven 34 and within the fused pre-sheet 36, it is advantageous that the heating/fusion oven 34 be divided into two or more internal heating chambers having alternating cross-flow heating air currents, as illustrated in FIG. 4. Thus, it will be seen that the heating/fusion oven 34 is transversely bisected by a vertical interior dividing wall 70, having an opening for passage of the fused pre-sheet 36 therethrough, so as to form two substantially separate internal heating chambers of generally equal volume. The first of the internal heating chambers is the upstream chamber labeled "Chamber #1" in FIG. 4. The second of the internal heating chambers is the adjacent downstream chamber labeled "Chamber #2". Both Chamber #1 and Chamber #2 are heated by hot air convection currents that flow through each of the heating chambers in opposite directions. That is, in Chamber #1, the hot air convection currents 72 enter the chamber through downwardly directed supply nozzles 74 arranged along the top of Chamber #1 and exit Chamber #1 through a return duct 76 arranged along the bottom of Chamber #1 adjacent to the dividing wall 70. This cross-chamber air flow in Chamber #1 is represented in FIG. 4 by small arrows F. In contrast, in Chamber #2, the hot air convection currents 78 enter the chamber through upwardly directed supply nozzles 80 arranged along the bottom of Chamber #2, and exit Chamber #2 through return vents 82 arranged along the top of Chamber #2. This cross-chamber air flow in Chamber #2 is represented in FIG. 4 by small arrows G. Having the cross-flow direction of Chamber #1 reversed from that of Chamber #2 ensures more complete and even heating of the fused pre-sheet 36 as it moves through the heating/fusion oven 34, which even heating is essential to quality control of the end product foam sheet or plank, particularly where such foam sheet or plank has a thickness greater than about 50 cm (about 2 inches). Of course, it is possible for the convection currents in Chamber #1 to flow upwardly while the convection currents in Chamber #2 flow downwardly. Other air flow directions can also be employed if desired.

The temperature of the hot air being introduced into Chamber #1 and Chamber #2 should be in the range of about 60 degrees Celsius (about 140 degrees Fahrenheit) to about 193 degrees Celsius (about 380 degrees Fahrenheit), and more preferably in the range of about 82 degrees Celsius (about 180 degrees Fahrenheit) to about 204 degrees Celsius (about 400 degrees Fahrenheit), but the temperature is not limited thereto. These temperatures work well with the foam starting materials discussed above, where the second conveyor 32 is moving the fused pre-sheet 27 through the heating/fusing oven 34 at speeds from about 1 ft/min (0.3 m/min) to about 30 ft/min (9 m/min), but the process and apparatus of the invention are not limited to these values. With these rates of conveyor movement, it is possible to obtain even heat distribution in the fused pre-sheet 27 (with resultant thorough fusion between the foam particles 24 thereof), while achieving oven dwell times of about 1 minute to about 30 minutes. A more preferred dwell time in the heating/fusion oven 34 is about 1.5 to about 6 minutes, at a conveyor speed from about 20 ft/min to about 2 ft/min, with the temperature of the oven being about 115 degrees Celsius to about 180 degrees Celsius.

The average dwell time in the heating/fusion oven 34 is about 3 minutes at a conveyor speed of 10 ft/min and a temperature of 140 degrees Celsius, subject to foam particle 24 makeup.

The fused foam particle sheet exits the oven in the form of the fused pre-sheet 36, having a temperature in the range from about 115 degrees Celsius to about 180 degrees Celsius, with an average temperature of about 140 degrees Celsius.

The second conveyor 32 thereafter delivers the hot and fused foam fused pre-sheet 36 to the compression and cooling device 40 of the apparatus 20 for subsequent processing. The purpose of the compression and cooling device 40 is to compress the fused pre-sheet 36 to the desired thickness and density and to cool this layer, thus producing a final sheet S having the desired dimensions and properties.

The compression and cooling device comprises a compression assembly 90 and a cooling assembly 100. The compression assembly 90 in the embodiment of FIG. 5 comprises a pair of spaced side frames 92 (only one of which is visible in FIG. 5), each of which has three downwardly projecting transversely extending leg portions 92a, 92b, and 92c (i.e., six leg portions in total). Each corresponding pair of leg portions has mounted for rotation therebetween, adjacent their lower ends, a respective transversely extending compression roller 93a, 93b, and 93c. A compression belt 94, constructed from a water-permeable stainless steel mesh or the like (which mesh may be TEFLON® (PTFE) coated), surrounds the three compression rollers 93a, 93b, and 93c to form an endless loop, and the entire compression assembly 90 is adjustable in position both vertically upward and vertically downward as indicated by double-headed arrow H. An electrical drive motor (not shown) drives at least one of the compression rollers 93a, 93b, and/or 93c in a counter-clockwise direction as seen in FIG. 5, which, in turn, causes the compression belt 94 to rotate in the same general direction, as indicated by the arrows I of FIG. 5. Vertical adjustment of the position of the compression assembly 90 allows the nip formed between the compression belt 94 and the top surface of the second conveyor 32 to be adjustable in height so as to accommodate the formation of finished sheets or planks of variable thickness. Moreover, downward pressure exerted by the compression assembly 90 (through the agency of the rollers 93a, 93b, and 93c acting on the compression belt 94) on the fused pre-sheet 36 entering the nip can also be readily varied by vertical adjustment of the compression assembly 90 to thereby adjust the density of the finished sheets or planks. In this latter regard, the compression assembly 90 should desirably have a capacity of developing pressure from about 20 psi to about 500 psi on the fused pre-sheet 36 passing through the nip, the variance being determined by the density requirement of the finished sheets or planks, which sheets or planks have substantially smooth upper and lower surfaces in the embodiment of FIG. 5. The average compression pressure used is typically in the range of about 50 psi to about 500 psi.

As previously noted, the pro-forma particulate layer 27 entering the heating/fusion oven 34 typically may decrease in thickness by about 60% or more by the time the layer exits the heating/fusion oven 34 as the fused pre-sheet 36. Moreover, a further thickness decrease of about 50% may typically be encountered as between the fused pre-sheet 36 entering the nip of the compression assembly 90 and the sheet or plank S exiting from the compression assembly 90.

Once the desired thickness and densities are achieved in the region between the front two compression rollers 93a and 93b, the compressed foam sheet or plank is rapidly cooled by the cooling assembly 100, while still in the desired compression mode, with chilled water emitted from spray nozzles 97 formed on the underside of a water supply header 96, which supply header 96 is preferably positioned between the second compression roller 93b and third 93c compression roller. The sprayed cooling water is collected below the second conveyor 32 by a catchment basin 98, and is continuously recirculated therefrom through a conventional chiller system (not shown) that maintains the cooling water at a temperature range of about 15 degrees Celsius to about 45 degrees Celsius. A vacuum assist (not shown) may be applied in the region of the catchment basin 98 to speed removal of cooling water from the sheet or plank S.

The average temperature of the cooling water is preferably about 18 degrees Celsius to about 20 degrees Celsius, and the cooling water is in contact with the sheet for about 30 seconds to one minute. The cooling assembly 100 can thus be seen to essentially comprise the water supply header 96, the spray nozzles 97, and the catchment basin 98.

Once the foam sheet or plank S is cooled to a range of about 26 degrees Celsius to about 45 degrees Celsius, the foam sheet or plank sets to its predetermined target dimensions. The average setting temperature for the cooled sheet or plank is in the 30 degree Celsius range, subject to line speed and product thickness.

The compression assembly 90 can also be configured as an embossing system as seen in the first and second alternate embodiments depicted in each of FIGS. 6, 6A, 6B, and 6C, and FIGS. 7, 7A, 7B, and 7C, respectively. In the drawings depicting these two alternate embodiments, similar reference figures and numerals as have been used in FIGS. 1 through 5 have been retained in respect of analogous structures.

In the first alternative embodiment illustrated in FIGS. 6, 6A, 6B, and 6C, the substantially smooth compression belt 94 shown in FIGS. 1 through 5 is replaced by a modified compression belt 94' having removable endless male embossing belts 95 attached in regular spaced relation around the underlying compression belt 94' so as to define a series of valleys 97 between the embossing belts 95. Thus, as will be appreciated from FIGS. 6A and 6B, use of this modified compression and cooling device 40a in the same general manner described above in relation to the process and apparatus of FIGS. 1 through 5 will produce a final sheet or plank S having a series of longitudinally extending grooves 99 (corresponding to the profile of the embossing belts 95) each positioned between two longitudinally extending raised lands 101 defined by the profile of the valleys 97. The longitudinal grooves 99 may advantageously have a depth of about ¼" to about 1¾" positioned on about 1" to about 12" centers, with a typical average depth being about ½" to ¾" on about 2" to 2.5" average centers.

In the second alternative embodiment illustrated in FIGS. 7, 7A, 7B, and 7C, a modified compression and cooling device 40b having no compression belt is depicted. Additionally, the three downwardly depending legs 92a, 92b and 93c of the earlier embodiments are replaced by front 92a and rear 92c downwardly depending legs of substantially equal length, which are joined to one another by a lower horizontal cross bar 92d. Modified compression rollers 93a', 93b', and 93c' replace the corresponding smooth compression rollers 93a, 93b and 93c shown previously. The compression rollers 93b' and 93c' are each modified in the same general manner to have a series of male embossing ribs 104 disposed in regular spaced relation around their outer circumference. In this manner, they each define a series of valleys 103 between the embossing ribs 104.

The lead compression roller 93a' is also modified in the second alternative embodiment to be of larger diameter than the lead compression roller 93a of the earlier described embodiments, and to have a series of raised ribs 105 parallel to its rotational axis spaced around its outside circumference. The raised ribs 105 define between themselves a corresponding series of valleys 106, also aligned with the rotational axis of the compression roller 93a'. Thus, it will be appreciated from FIGS. 7, 7A, 7B, and 7C that the use of this modified compression and cooling device 40b in the same general manner described above will produce a final sheet or plank S having a cross-hatched upper surface.

Trim saws (not shown) running parallel to the direction of travel of the sheet S may be advantageously used to trim or cut to a desired width, trimming on both sides, one side only, or not at all, subject to end user requirements. Trimming width range is typically from about 36" to about 60", with an average trimming width being about 48".

From the trim saw station (not shown) the fused plank or sheet S advantageously enters a cut-off station (not shown) where a flying saw moving transverse to the direction of sheet travel cuts the foam plank or sheet S to a desired length. The flying saw can automatically cut the finished foam sheet or plank into predetermined lengths from about 36" up to about 96", depending on customer specifications. Average cut length is 48" to 60". Finished foam sheets or planks can be stacked and palletized at the end of production line apparatus 20. Where continuous roll stock foam product is desired, the sheets can be cut from about 50 feet to about 250 feet in length. Average roll-stock length is about 100 feet. Finished roll-stock foam end product of any desired length can be rolled up at the end of the production line apparatus 20 by means of a specially designed winder.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. An apparatus for continuously producing polymer foam sheets or planks from starting polymer foam material comprising virgin and/or postindustrial polymer foam materials that have been comminuted into particles, the apparatus comprising:
a metering device including a moving conveyor and being structured and arranged to meter the particles, which are free of any added binder or adhesive, from a storage location onto the moving conveyor at a controlled volumetric rate so as to continuously form a layer of the particles on the conveyor, the metering device including a variable dispensing device to dispense the particles onto the conveyor, the variable dispensing device being variable in geometry for adjusting a size of an opening through which the particles are dispensed so as to regulate the volumetric rate at which the particles are dispensed;
a heating device structured and arranged to heat the layer of particles to a temperature sufficient to render the particles tacky such that the particles adhere to one another so as to form a substantially integral sheet;
a compression device structured and arranged to apply pressure on the advancing sheet so as to compress the sheet to a smaller thickness and enhance the integrity of the sheet; and
a cooling device for cooling the compressed sheet.

2. The apparatus of claim 1, wherein the storage location for the particles comprises a hopper having a bottom wall sloping downward toward a front wall of the hopper, and wherein the variable dispensing device comprises an metering gate adjacent an opening in the front wall of the hopper, a metering aperture being defined between the metering gate and the bottom wall through which the particles flow aided by the influence of gravity, the metering gate being adjustable in position for regulating the metering aperture.

3. The apparatus of claim 1, wherein the heating device comprises a housing that defines a substantially enclosed interior, and a system for circulating heated air through the interior of the housing.

4. The apparatus of claim 3, wherein the interior of the housing is divided into substantially separate first and second chambers, the second chamber being downstream of the first chamber in the direction of travel of the layer through the housing, and wherein the system for circulating heated air is structured and arranged to circulate a first portion of the heated air through the first chamber in a first direction and to circulate a second portion of the heated air through the second chamber in a second direction different from the first direction.

5. The apparatus of claim 4, wherein one of the first and second directions is generally vertically downward and the other of the first and second directions is generally vertically upward.

6. The apparatus of claim 3, wherein an upper surface of the layer is not contacted by any belt or any part of the heating device as the layer travels through the heating device.

7. An apparatus for continuously producing polymer foam sheets or planks from starting polymer foam material comprising virgin and/or postindustrial polymer foam materials that have been comminuted into particles, the apparatus comprising:
a metering device including a moving conveyor and being structured and arranged to meter the particles, which are free of any added binder or adhesive, from a storage location onto the moving conveyor at a controlled volumetric rate so as to continuously form a layer of the particles on the conveyor;
a heating device structured and arranged to heat the layer of particles to a temperature sufficient to render the particles tacky such that the particles adhere to one another so as to form a substantially integral sheet;
a compression device structured and arranged to apply pressure on the advancing sheet so as to compress the sheet to a smaller thickness and enhance the integrity of the sheet;
a cooling device for cooling the compressed sheet; and
at least one rotating device contacting the layer of particles on the moving conveyor so as to regulate the thickness of the layer before the layer is advanced to the heating device, the at least one rotating device having circumferentially spaced members for contacting the particles on the moving conveyor, the at least one rotating device being rotatably driven such that said members move in a direction opposite to a direction of travel of the conveyor as said members contact the particles.

8. The apparatus of claim 7, wherein the at least one rotating device is vertically adjustable in position for adjusting a vertical spacing between said members of the at least one rotating device and the conveyor so as to regulate the thickness of the layer on the conveyor.

9. The apparatus of claim 8, wherein the at least one rotating device comprises first and second rotating devices spaced apart along the direction of travel of the conveyor and each having said members moving in the direction opposite to the direction of travel of the conveyor.

10. The apparatus of claim 9, wherein the second rotating device is downstream of the first rotating device along the direction of travel of the conveyor, and the vertical spacing between said members of the second rotating device and the conveyor is smaller than the vertical spacing between said members of the first rotating device and the conveyor.

11. An apparatus for continuously producing polymer foam sheets or planks from starting polymer foam material comprising virgin and/or postindustrial polymer foam materials that have been comminuted into particles, the apparatus comprising:
a metering device including a moving conveyor and being structured and arranged to meter the particles, which are free of any added binder or adhesive, from a storage location onto the moving conveyor at a controlled volumetric rate so as to continuously form a layer of the particles on the conveyor;
a heating device structured and arranged to heat the layer of particles to a temperature sufficient to render the particles tacky such that the particles adhere to one another so as to form a substantially integral sheet;
a compression device structured and arranged to apply pressure on the advancing sheet so as to compress the sheet to a smaller thickness and enhance the integrity of the sheet, wherein the compression device comprises a conveyor on which the sheet is supported and advanced, and a compression member that defines a nip with the conveyor through which the sheet is advanced by the conveyor, wherein the compression member is configured for embossing the sheet with a predetermined embossing pattern; and a cooling device for cooling the compressed sheet.

12. The apparatus of claim 11, wherein the cooling device is arranged to cool the sheet concurrently with the compression of the sheet by the compression device.

13. The apparatus of claim 12, wherein the cooling device comprises a water spray device for spraying chilled water on the sheet.

14. The apparatus of claim 11, wherein the compression member comprises a compression belt.

15. The apparatus of claim 14, wherein the compression member further comprises embossing members secured to the compression belt for embossing the sheet with the predetermined embossing pattern.

16. The apparatus of claim 11, wherein the compression member comprises a first compression roller.

17. The apparatus of claim 16, wherein the first compression roller has an outer surface configured to emboss the sheet with the predetermined embossing pattern.

18. The apparatus of claim 16, wherein the compression member further comprises a second compression roller spaced downstream of the first compression roller.

19. The apparatus of claim 18, wherein the first compression roller has an outer surface configured to emboss the sheet with a predetermined first embossing pattern and the second compression roller has an outer surface configured to emboss the sheet with a predetermined second embossing pattern different from the first embossing pattern.

20. An apparatus for continuously producing polymer foam sheets or planks from starting polymer foam material comprising virgin and/or postindustrial polymer foam materials that have been comminuted into particles, the apparatus comprising:

a metering device including a moving conveyor and being structured and arranged to meter the particles, which are free of any added binder or adhesive, from a storage location onto the moving conveyor at a controlled volumetric rate so as to continuously form a layer of the particles on the conveyor;

a heating device structured and arranged to heat the layer of particles to a temperature sufficient to render the particles tacky such that the particles adhere to one another so as to form a substantially integral sheet;

a compression device structured and arranged to apply pressure on the advancing sheet so as to compress the sheet to a smaller thickness and enhance the integrity of the sheet, wherein the compression device comprises a conveyor on which the sheet is supported and advanced, and a compression member that defines a nip with the conveyor through which the sheet is advanced by the conveyor, wherein the compression member is adjustable in vertical position for adjusting a height of the nip in order to produce sheets of various thicknesses; and a cooling device for cooling the compressed sheet.

* * * * *